United States Patent
Lai et al.

(10) Patent No.: US 7,398,499 B2
(45) Date of Patent: Jul. 8, 2008

(54) METHOD OF SEARCHING PATHS SUFFERING FROM THE ELECTROSTATIC DISCHARGE IN THE PROCESS OF AN INTEGRATED CIRCUIT DESIGN

(75) Inventors: Ming-Hong Lai, Tao-Yuan (TW);
 Chao-Yi Cho, Tao-Yuan (TW);
 Chia-Chi Chu, Tao-Yuan (TW);
 Wu-Shiung Feng, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 37 days.

(21) Appl. No.: 11/440,349

(22) Filed: May 24, 2006

(65) Prior Publication Data

US 2007/0277138 A1 Nov. 29, 2007

(51) Int. Cl.
 *G06G 17/50* (2006.01)
(52) U.S. Cl. ................................ 716/12; 716/1; 716/14
(58) Field of Classification Search .................... 716/12, 716/14, 1
 See application file for complete search history.

(56) References Cited

U.S. PATENT DOCUMENTS

| | | | |
|---|---|---|---|
| 6,274,911 B1 | 8/2001 | Lin et al. | 257/358 |
| 6,730,968 B1 | 5/2004 | Wu et al. | 257/355 |
| 6,894,881 B1 | 5/2005 | Vashchenko et al. | 361/56 |
| 6,906,357 B1 | 6/2005 | Vashchenko et al. | 257/153 |

OTHER PUBLICATIONS

Gramacy,"Shortest Paths and Network Flow Algorithms for Electrostatic Discharge Analysis", Jun. 2001, University of California at Santa Crus, Senior Thesis, pp. 1-50.*

* cited by examiner

*Primary Examiner*—Sun James Lin
(74) *Attorney, Agent, or Firm*—Mark A. Mersereau; Nikolai & Mersereau, P.A.

(57) ABSTRACT

A method of searching paths that are susceptible to electrostatic discharge (ESD) at the beginning of an integrated circuit (IC) design is disclosed that includes a circuit spreading out algorithm, a matrix closure algorithm, and a supernode algorithm. The found paths are required to satisfy conditions including that (a) they are connected from a gate of a transistor to a source or a drain thereof, and (b) the head node and the tail node of each path are pins of a top level of the IC. −1/0/1 matrix multiplication is employed by both the circuit spreading out algorithm and the matrix closure algorithm so as to obtain a result of node connections after a plurality of matrix self-multiplications.

6 Claims, 6 Drawing Sheets

METHOD OF SEARCHING PATHS SUFFERING FROM THE ELECTROSTATIC DISCHARGE IN THE PROCESS OF AN INTEGRATED CIRCUIT DESIGN

BACKGROUND OF THE INVENTION

1. Field of Invention

The invention relates to electrostatic discharge (ESD) prevention techniques and more particularly to a method of searching paths that are susceptible to ESD at the beginning of an integrated circuit (IC) design.

2. Description of Related Art

In manufacturing, assembling, packaging, and delivering of electronic devices and even at the time of using an electronic device by a user, there is pretty high probability of damaging the electronic device due to electrostatic discharge (ESD). Thus, a variety of ESD protection structures and circuits are provided and mounted in an electronic device. For example, when a deep submicron system-on-a-chip (SoC) is employed in a semiconductor manufacturing process, the SoC is susceptible to ESD. Thus, internal components of SoC may be severely damaged by momentary unwanted currents. For the protection of SoC, an ESD protection circuit is provided to eliminate ESD.

ESD protection is even more important for semiconductor manufacturing industry. Typically, eight principles for ESD protection are outlined below.

1. Preventing critical signal lines from disposing near lines to be protected;
2. arranging interfaces together at one side as possible as it can be;
3. avoiding protected loops connecting in parallel to loops that are not protected;
4. designing an area around a loop consisting of different signal lines and their feeders to be as small as possible, and even considering to change positions of signal lines or ground wires if necessary;
5. keeping homing, interrupting, and controlling signals far from input/output (I/O) ports and the edges of a printed circuit board (PCB);
6. connecting interface signal lines and ground lines to a component to be protected and to other parts of the loop;
7. making use of highly integrated components and a diode array that may not only greatly save space of a circuit board but also lower the self inductance of a parasite circuit that is caused by a complicated loop; and
8. adding ground points if it is possible.

Of the above eight principles, principles 1 through 5 are well known to a circuit designer. However, even if the five principles are fully carried out, they cannot completely prevent the components of SoC from being damaged by ESD.

The five principles at most can decrease the probability of an electric device being damaged by ESD. It is not perfect. Principles 6 and 7 are the most important ones in the current ESD protection technology. Parallel connection is made to components protected by a circuit in which many options are available for the protected components. Such is disclosed in U.S. Pat. Nos. 6,906,357, 6,894,881, 6,730,968, and 6,274,911.

Typically, in IC protection a diode is employed because diode can be easily integrated with other components of a chip. For example, there are components provided with the functions of electromagnetic interference (EMI) prevention and radio frequency interference (RFI) prevention being integrated with the diodes. This not only reduces the number of components employed in IC design (and thus saves cost) but also avoids self-inductance caused at the time of IC layout on a PCB. A diode for transient voltage suppression (TVS) diode is typically employed as a protection component against ESD generated in an IC. Compared with a conventional Zener diode (ZD), TVS diode is capable of withstanding higher voltage and has a lower voltage cut-off ratio. Thus, TVS diode provides a better effect on voltage loop protection.

Thus, it is desirable to provide a novel method of searching paths that are susceptible to ESD at the beginning of an IC design in order to overcome the inadequacies of the prior art.

SUMMARY OF THE INVENTION

It is therefore one object of the invention to provide a method of searching paths that are susceptible to ESD at the beginning of an IC design. By utilizing this method, it is possible of greatly saving time and cost of the IC design.

The above and other objects, features and advantages of the invention will become apparent from the following detailed description taken with the accompanying drawings.

DETAILED DESCRIPTION OF THE INVENTION

Figure 1:
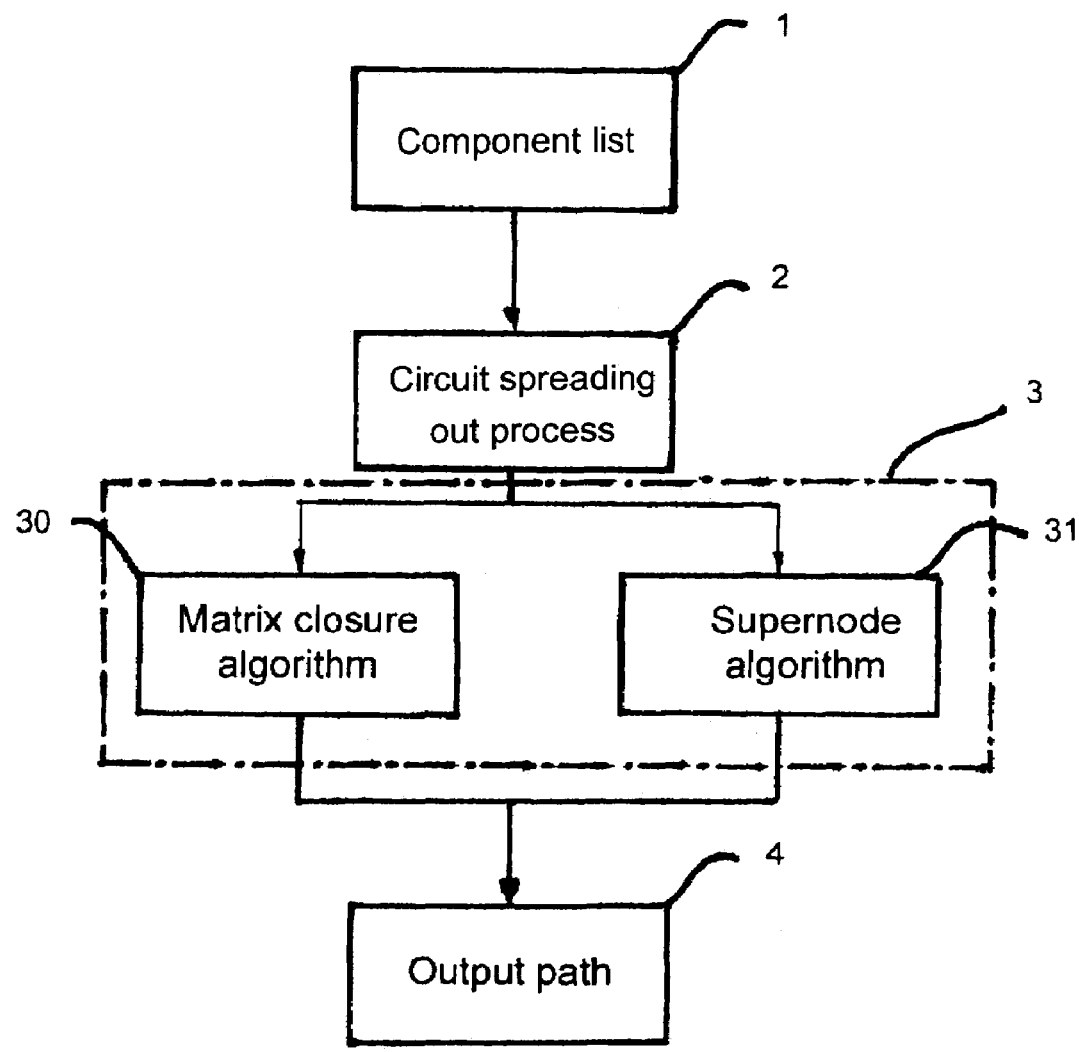
FIG. 1 is a flow chart according to the invention.

Referring to FIG. 1, a method of searching paths that are susceptible to electrostatic discharge (ESD) at the beginning of an integrated circuit (IC) design in accordance with the invention is illustrated.

Component list in step 1 means data about resistors, inductors, capacitors, conductors, diodes, passive elements, and active elements such as metal-oxide semiconductors (MOSs) and the component list is fed to a computer for storage.

Circuit spreading out process in step 2 means spreading out circuit associated with the component list.

Step 3 comprises two algorithms in which step 30 involves a matrix closure algorithm and step 31 involves a supernode algorithm. For matrix closure algorithm, a −1/0/1 matrix is created by connecting nodes and a target path is obtained by multiplying matrices. For supernode algorithm in which supernodes are expanded to decrease the number of nodes, thereby reducing the complexity of searching paths that are susceptible to ESD and decreasing memory consumption. As such, all paths susceptible to ESD can be quickly found in which pin paths are from gate to source (or drain) and are from source to drain.

Step 4 is for output path in which paths susceptible to ESD are analyzed at this output steps by the computer.

For saving time of running programs, the invention in advance provides a detailed data structure to simplify the operation, such as sub-circuit information, node information, and child node information. Then, the detailed structure of a test circuit is quickly recorded. Due to huge quantity of node data, a hash function is performed to store nodes, and a relevant linked-list data structure is employed to store front stage and rear stage relationships of all elements of a database for node. This arrangement is quite helpful to convert and calculate the circuit.

Figure 2:
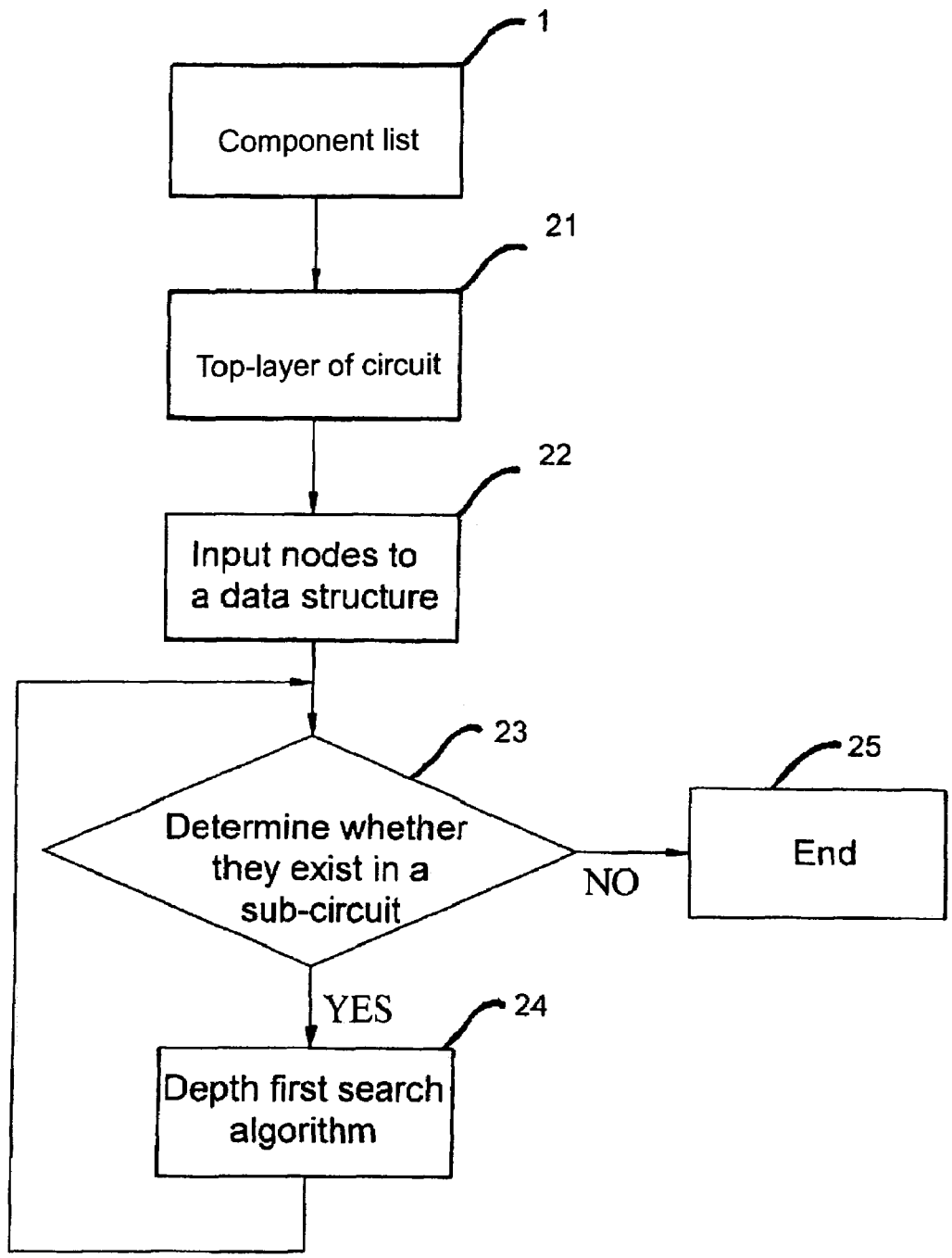
FIG. 2 is a flow chart illustrating the circuit spreading out process of FIG. 1.

Referring to FIG. 2, a flow chart illustrates the circuit spreading out process in step 2. In IC (e.g., very large scale integration (VLSI) circuit) design, a hierarchical circuit structure is employed. The technology of circuit spreading out is employed by the invention in which the hierarchically structured circuit is analyzed in either top-down or bottom-up. In the algorithm that converts the hierarchical circuit into the spreading out circuit, according to sub-circuit information with X representing the symbol, in a topmost layer of circuit a method of Depth First Search (DFS) is used to read nodes of sub-circuit in the data structure. In order to avoid an information reading error caused by a plurality of applied single sub-circuits in the circuit, the invention connects in series the sub-circuit node name to the topmost circuit name. Finally, a spreading out circuit corresponding to the original circuit is obtained.

In step 21, after inputting the component list data search for a sub-circuit of each node in a circuit by starting from the topmost layer of the circuit.

In step 22, node data in the topmost layer of the circuit is stored in the data structure.

In step 23, it is determined whether the read data exists in the sub-circuit or not. If yes, the process goes to step 24. Otherwise, the process jumps to step 25 as an end of the process.

In step 24, a recursive algorithm for DFS is performed to search all nodes in the bottom layer of circuit and the found nodes are then sent to the data structure. Thereafter, the process loops back to step 23 for next not read data.

Figure 3:
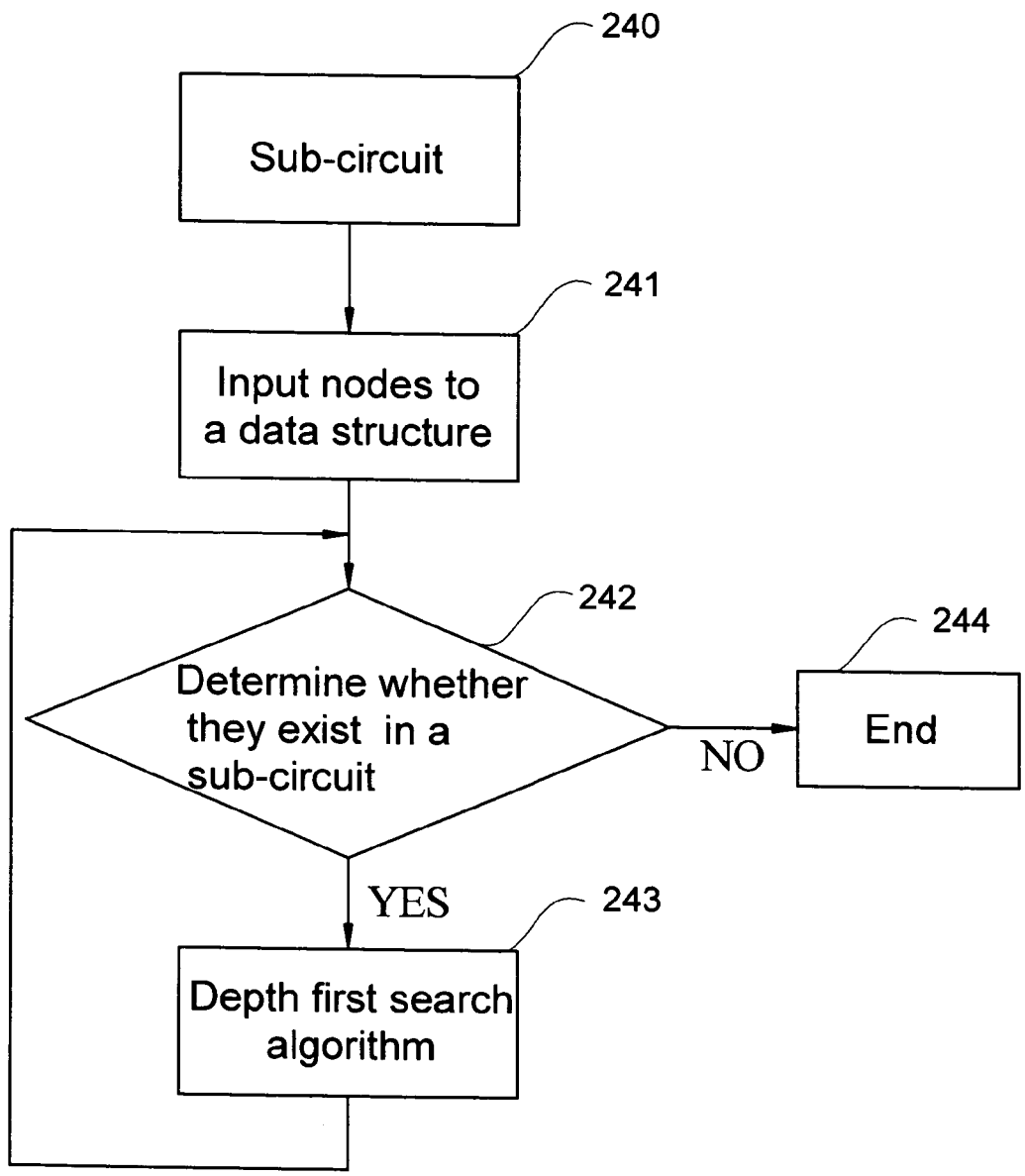
FIG. 3 is a flow chart illustrating the depth first search algorithm of FIG. 2.

Referring to FIG. 3, a flow chart illustrates the DFS algorithm in step 24.

In step 240, components, instant names, cell names, and I/O pins of a sub-circuit are read.

In step 241, information about each node in the sub-circuit is sequentially sent to the data structure. For preventing node names of the circuit from repeating, the invention connects in series the node names of sub-circuit to the name of the top layer of circuit.

In step 242, determination is made whether there is any sub-circuit not analyzed or not. If there still is a sub-circuit not analyzed, the process goes to step 243. Otherwise, the process jumps to step 244 to end.

In step 243, the DFS algorithm is performed prior to looping back to step 242 for continuation.

In the recursive algorithm for DFS, the hierarchical structure of the original circuit can be converted into the structure of the spreading out circuit for subsequent algorithms.

Figure 4:
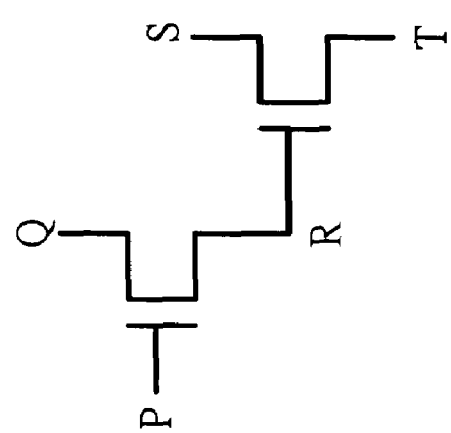
FIG. 4 is a schematic view showing the structure of a closure matrix according to the invention.

Referring to FIG. 4, a schematic view of the structure of a closure matrix according to the invention is shown.

Figure 5:
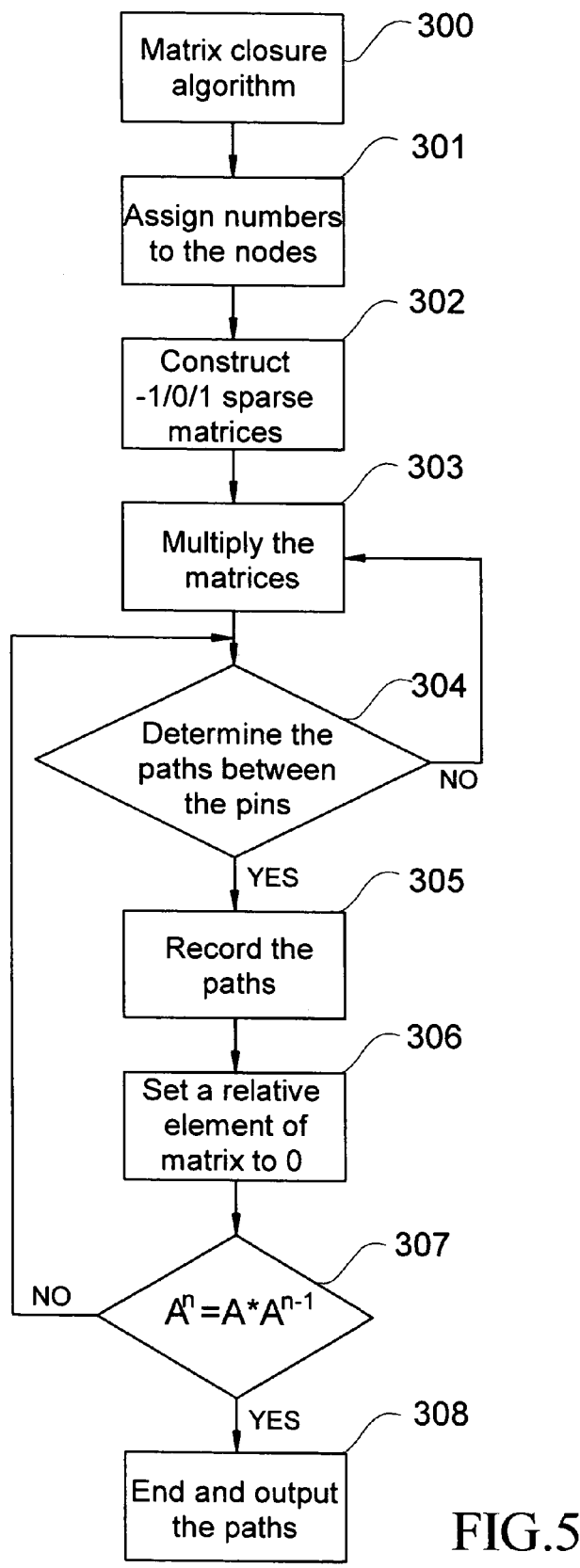
FIG. 5 is a flow chart illustrating the matrix closure algorithm of FIG. 1.

Referring to FIG. 5, a flow chart of the matrix closure algorithm in step 30 is illustrated.

For showing a circuit structure, an array is used to represent a relationship of nodes in the circuit. In the invention, the matrix closure algorithm is used to check the relationship of nodes. In the matrix closure algorithm, an array A is defined for the relationship of all nodes, and the structure of array is directional. After self-multiplifying a matrix A a number of times (e.g., n times) (i.e., $A^{n+1}=A\times A^n$), information about each node on interconnected paths can be obtained.

By defining as above, the invention searches a target path by using the $-1/0/1$ array multiplication closure. At first, numbers are assigned to all nodes in the circuit, and a $-1/0/1$ array is created for representing the relationship of nodes. If a node passes through the gate of a transistor, the location number is $-1$. If it passes through two terminals of a passive element or source and drain of the transistor, the location number is 1 and the remaining ones are 0. By defining as above, the matrix A is formed from a simple circuit at left of FIG. 4. After self-multiplying the matrix A one time, an array $A^2$ is obtained (see FIG. 4) in which $A^2(Q,S)=A(Q,R)\times A(R,S)=-1$ an expression representing a path leading to gate one time and $A^2(P,T)=A(P,R)\times A(R,T)=0$ means the path leads to gate two times. The above algorithm is detailed below in FIG. 5.

In step 300, the matrix closure algorithm begins with the spreading out circuit as input.

In step 301, numbers are assigned to all pins and nodes for identifying the properties of nodes and structure and operation of the array.

In step 302, a $-1/0/1$ sparse matrix A is created to represent the relationship of nodes. If the node passes through gate of the transistor, the location number is $-1$. If it passes through two terminals of a passive element or source and drain of the transistor, the location number is 1 and the remaining ones are 0.

In step 303, the matrix A is self-multiplied n times (i.e., $A^{n+1}=A\times A^n$). The matrix remains as a $-1/0/1$ matrix. The matrix is described below.

It is assumed that the node numbers are i, j, and k, (1) when $A^{n-1}(i,k)=-1$ and $A^{n-1}(k,j)=-1$ and $A^{n-1}(i,k)=0$ and $A^{n-1}(k,j)=0$, then $A^n(i,j)=0$; (2) when and $A^{n-1}(i,k)=0$ and $A^{n-1}(k,j)=-1$ and $A^{n-1}(i,k)=-1$ and $A^{n-1}(k,j)=1$, then $A^n(i,j)=-1$; and (3) when $A^{n-1}(i,k)=0$ and $A^{n-1}(k,j)=1$ and $A^{n-1}(i,k)=1$ and $A^{n-1}(k,j)=1$, then $A^n(i,j)=1$.

In step 304, determination is made whether the paths exist between the pins and whether the target paths exist after the matrix closure multiplication. If not, then the process returns to step 303 for repeating the matrix closure multiplication step, and if the nodes i and j are I/O pins of the topmost layer of circuit and or $A^n(i,j)=1$ or $A^n(i,j)=-1$, then target paths can be obtained.

In step 305, the paths are recorded in the data structure of the memory of computer except the path labeled 0. Since the principle of passing through a gate is not followed (see FIG. 4), both $A^2(P,S)=0$ and $A^2(P,T)=0$ in the matrix $A^2$ are obtained.

In step 306, a relative element of the matrix is set to 0. After the paths are recorded in step 305, $A^n(i,j)=0$ is set to satisfy the requirement of only head and tail nodes being served as pins in the paths susceptible to ESD. After the array closure operation is performed, the relationship of nodes is further demonstrated.

In step 307, determination is made whether $A^{n+1}=A\times A^n$ exists or not. If yes, the process goes to step 308 to finish the searching for the paths and a result about the path search is sent as output prior to ending. Otherwise, the process loops back to step 304 for continuation.

Currently, in IC design a node generally links a neighboring node and thus an element of a matrix is 0. Thus, a dense matrix is applied for operation and memory space is consumed excessively. As a result, the algorithm performs slowly. Also, a large memory is required to construct a matrix. As a result, the sparse matrix is employed by the invention to reduce the complexity of algorithm. Only values (X value and Y value) and its addresses are recorded by the sparse matrix, thereby saving memory. Further, occupied memory for the product of sparse matrices is less than that for the product of dense matrices. This effect is more significant as the size of matrix increases.

Figure 6:
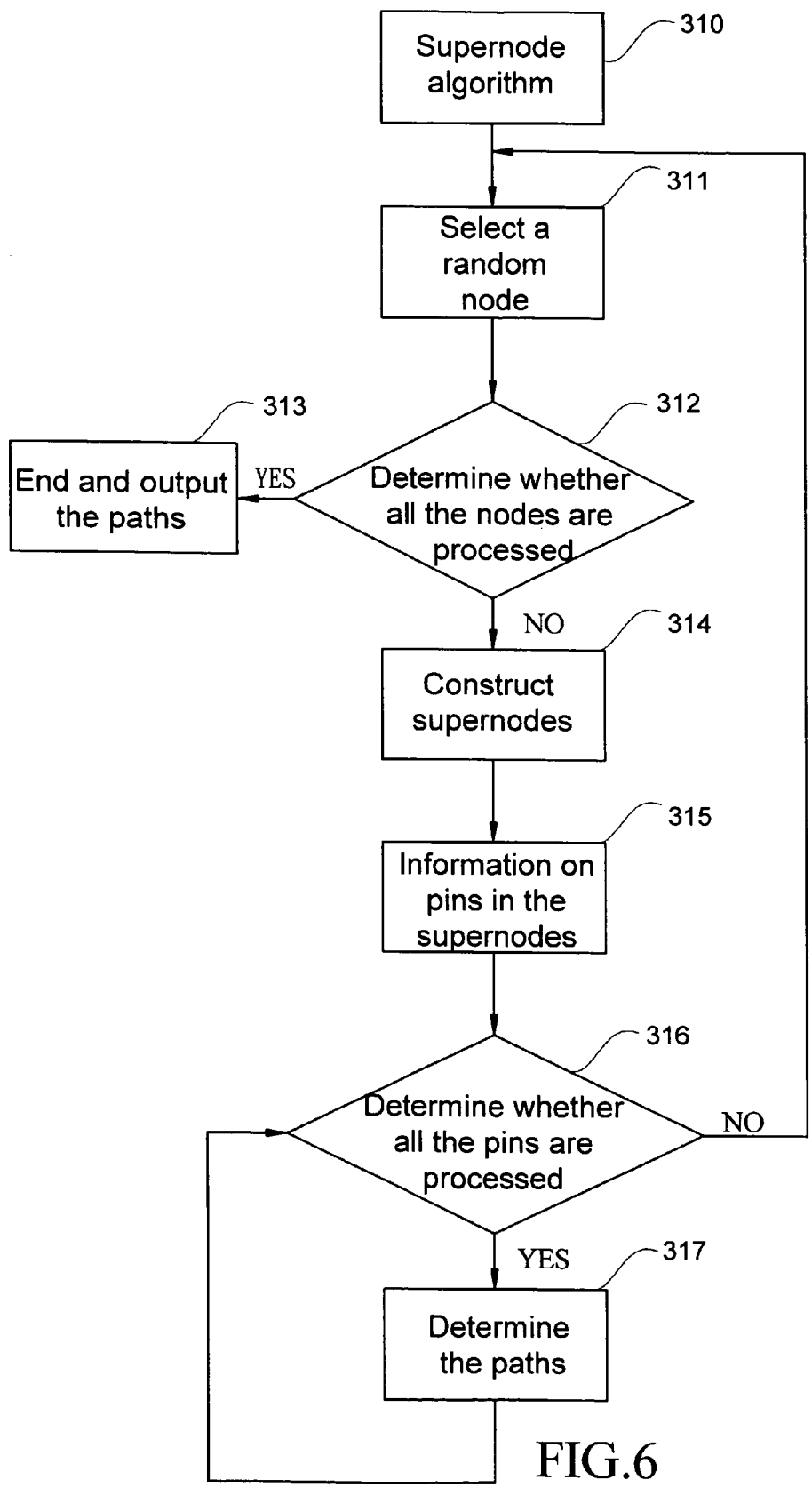
FIG. 6 is a flow chart illustrating the supernode algorithm of FIG. 1.

Referring to FIG. 6, a flow chart the supernode algorithm in step 31 is illustrated. After the whole circuit has been spreaded out in step 2, the matrix closure algorithm at step 30 can be applied.

The component list has about ten thousands nodes of the circuit. To reduce the complexity of algorithm, the concept of supernode is adopted by the invention. The nodes having the same status are grouped together. How to expand and limit the supernodes is the characteristic of this algorithm.

In step 310, the supernode algorithm is performed.

In step 311, a random node is selected in which the nodes in the circuit not processed are set as seed nodes of the supernode from which the supernode is expanded.

In step 312, determination is made whether all nodes are processed or not. If yes, the process jumps to step 313 to end the process. In detail, nodes (i.e., gates of the transistor) in the circuit having the characteristics of seed nodes are arranged and processed in order. After processing the seed nodes, the process of the invention ends with the paths being sent as output. Otherwise, the process goes to step 314.

In step 314, supernodes are constructed from the original circuit. A node having the characteristics of a gate pin is selected from the circuit to serves as a seed node. Nodes connected to the above node including a source node and a drain node of the same transistor, are grouped together as a supernode. A node in the supernode is combined with a node having the same status to expand the supernode by executing a breadth first search (BFS) algorithm. For example, nodes at two terminals of a resistor and those of a diode are incorporated in the supernode in which the same status means that the connection does not pass through gate of the transistor. Moreover, excessively expanded supernodes make the algorithm of searching the paths in the supernodes more complicated. Thus, a heuristic method is provided by the invention for a user to determine an extent of expansion by himself or herself.

In step 315, information about pins in the supernode is retrieved. This means that the nodes having the characteristics of pins are fetched from the supernodes. After simplifying the circuit, edges between the supernodes have the characteristics of gate to source (or drain). Thus, the path is divided into two parts after determination in which one for a pair of pins in the supernode and the other for a pair of pins between the supernodes that only passes through an edge.

In step 316, determination is made whether all pins are processed or not. That is, it is determined whether the pair of pin exists or not. If yes, the process goes to step 317. Otherwise, the process loops back to step 311 for creating a new supernode.

In step 317, determine the paths (similar to that described in step 303 above) and record them in the data structure.

According to the invention, in the process of determining the paths, the target is the pin in the supernode. When pairs of pins exist in the supernode, the target path exists. When the existing paths satisfy conditions including (a) the path comprising only an edge from gate to source (or drain), and (b) only head and tail nodes serving as IO pin nodes in the path, the paths that are susceptible to ESD are found. At the end of step 317, the process loops back to step 316.

There are three algorithms, namely, the circuit spreading out process, the matrix closure algorithm, and the supernode algorithm are employed by the invention. Complexity of each of the above three algorithms is described below.

Basically, the circuit spreading out process and the supernode algorithm are DFS algorithms. The steps of the circuit spreading out process starts from the topmost layer of circuit. If a sub-circuit exists, the sub-circuit is renamed and added to the topmost layer of the circuit. If there is another sub-circuit is the sub-circuit, the node is added to the node data structure of the topmost layer of circuit according to the above rule. The supernode algorithm may be regarded as a combination of the BFS algorithm and the DFS algorithm. Determination of supernode structure is made in a one-time BFS algorithm, while the paths in the supernode network are searched in a one-time DFS algorithm. In the DFS algorithm, complexity is O(V+E) as being analyzed by a conventional technique in which V represents the number of nodes in a circuit and E represents the number of edges in a circuit. In Table 1 below, V and E in the algorithms are defined. Thus, the invention can find target paths of a complicated circuit within a linear period of time based on the above algorithms.

TABLE 1

|  | V | E |
|---|---|---|
| Flattening Algorithm | Number of nodes in a circuit | Number of edges in a circuit |
| Depth First Search Algorithm | Number of nodes in a circuit | Number of edges in a circuit |
| Supernode Construction Algorithm | Entries of nodes in supernodes | Number of edges in supernodes |
| Network | Entries of supernodes | Number of edges between supernodes |

In the matrix closure algorithm, numbers are first assigned to the nodes according to the relationship of nodes after spreading out. If the total number of nodes in the circuit is V, because the number of entries of the nodes is much less than V and a hash structure is used for data storage and search, the complexity of algorithm in number assignment is about O(V). Next, the complexity of algorithm for matrix multiplication of a matrix having a size V is $O(V^3)$ which takes much more time. The invention further uses the sparse array structure and performs array multiplication so as to greatly decrease memory to be used and reduce the complexity to $O(V^2)$. Thus, the algorithm complexity in the matrix closure algorithm is $O(V^2)$.

In a test experiment, three embodiments are performed for verifying accuracy of the above algorithms. In a first embodiment, there are 109 nodes and 17 pins. In a second embodiment, there are 11 nodes and 4 pins. In a third embodiment, there are 116 nodes and 17 pins. The inputted component lists have a hierarchical circuit structure. Nodes and pins in the three embodiments are shown in Table 2. Operation time and memory size are also shown in Table 2 according to the invention in which the operation time is a real part given from the command "timex" in a Sun workstation and the memory size is given from the command "top".

TABLE 2

|  |  | Test Embodiments | | |
|---|---|---|---|---|
|  |  | Embodiment 1 | Embodiment 2 | Embodiment 3 |
| Total Supernodes | | 109 | 11 | 116 |
| Total Pins | | 17 | 4 | 17 |
| Flattening | | 0.02 sec | 0.01 sec | 0.04 sec |
| Supernode Algorithm | Total Paths | 48 | 4 | 30 |
| | Time | 0.45 sec | 0.02 sec | 0.38 sec |
| | Memory Size | 3824 KB | 5824 KB | 4496 KB |
| Array Closure | Total Paths | 48 | 4 | 30 |

TABLE 2-continued

| | | Test Embodiments | | |
| --- | --- | --- | --- | --- |
| | | Embodiment 1 | Embodiment 2 | Embodiment 3 |
| Algorithm | Time | 0.3 sec | 0.01 sec | 0.44 sec |
| | Memory Size | 4760 KB | 2728 KB | 4280 KB |

In short, the invention provides two algorithms of searching paths that are susceptible to ESD. The two algorithms may work in a spreading out circuit and may find the paths that are susceptible to ESD in a circuit having millions of logic gates. According to the invention, tools for searching the paths that are susceptible to ESD comprises component lists input, circuit spreading out, supernode algorithm, and matrix closure algorithm. The paths that are susceptible to ESD as found by the above search are considered at the beginning of an IC design of an ESD protection circuit. By determining paths that are susceptible to ESD at the beginning of an IC design, it is possible of greatly saving time and cost of the IC design.

Also, the method of the invention can be implemented as computer-aided simulation software for preventing a circuit from being damaged by ESD.

While the invention herein disclosed has been described by means of specific embodiments, numerous modifications and variations could be made thereto by those skilled in the art without departing from the scope and spirit of the invention set forth in the claims.

What is claimed is:

1. A searching method comprising the steps of:
   feeding a component list of an integrated circuit (IC) to a computer;
   spreading out the component list;
   searching paths of the IC that are susceptible to electrostatic discharge (ESD) by running a matrix closure algorithm; and
   indicating the paths found in the searching in an output.

2. The searching method of claim 1, wherein the paths satisfy certain specifications including that (a) they are connected from a gate of a transistor to a source or a drain thereof, and (b) the head node and the tail node of each path are pins of a top level of the IC.

3. The searching method of claim 1, wherein the matrix closure algorithm comprises the steps of:

creating a −1/0/1 sparse matrix A based on the connections of nodes of the IC;
   self-multiplying the sparse matrix A at least one time;
   setting a matrix element as 0 when the connections exceed the limitation of the paths;
   connecting one node to the remaining nodes of the IC after n times of self-multiplications of the sparse matrix A for n connections of the nodes;
   searching a target path; and
   terminating the self-multiplication in response to finding no change after self-multiplying the sparse matrix A another time as being represented by $A^{n+1}=A^n \times A = A^n$.

4. A searching method comprising the steps of:
   feeding a component list of an integrated circuit (IC) to a computer;
   spreading out the component list;
   searching paths of the IC that are susceptible to electrostatic discharge (ESD) by running a supernode algorithm; and
   indicating the paths found in the searching in an output.

5. The searching method of claim 4, wherein the paths satisfy certain specifications including that (a) they are connected from a gate of a transistor to a source or a drain thereof, and (b) the head node and the tail node of each path are pins of a top level of the IC.

6. The searching method of claim 4, wherein the supernode algorithm comprises the steps of:
   selecting a node having a feature of the gate of the transistor as a seed node to expand to a supernode expansion;
   connecting the nodes together as a supernode having the same status as the seed node;
   determining an extent of the expansion of the supernode by a user;
   maintaining the supernode and its connections in response to ending the supernode enpansion step wherein the connection is from the gate of the transistor the source or the drain thereof; and
   providing first and second target paths wherein the first target path exists between pins of each supernode, the second target path exists between pins of the supernodes, and the target paths are required to satisfy the specifications.

* * * * *